Oct. 21, 1958

W. C. SMITH 2,857,357

METHOD OF VULCANIZING BUTYL RUBBER AND
PRODUCT RESULTING THEREFROM

Filed June 28, 1956

2 Sheets-Sheet 1

Winthrope C. Smith    Inventor

By *W. H. Smyers*    Attorney

Oct. 21, 1958

W. C. SMITH 2,857,357

METHOD OF VULCANIZING BUTYL RUBBER AND
PRODUCT RESULTING THEREFROM

Filed June 28, 1956

2 Sheets-Sheet 2

Winthrope C. Smith    Inventor

By *W. H. Smyers* Attorney

United States Patent Office 2,857,357
Patented Oct. 21, 1958

2,857,357

METHOD OF VULCANIZING BUTYL RUBBER AND PRODUCT RESULTING THEREFROM

Winthrope C. Smith, Westfield, N. J., assignor to Esso Research and Engineering Company, a corporation of Delaware Application June 28, 1956, Serial No. 594,444

27 Claims. (Cl. 260—43)

The present invention relates to a process for improving the cure rate of rubbery copolymers of isoolefins and multiolefins by employing a combination of a chlorinated rubbery copolymer and a phenol dialcohol compound. The rubbery copolymers which come within the scope of the present invention contain a major portion, preferably at least 70 wt. percent, of isoolefins, and a minor portion, preferably not more than 30% by weight, of multiolefins.

The present invention is directed toward the art of accelerating the curing rate of Butyl rubber. It is generally recognized that Butyl rubber presents a special problem with respect to compounding for vulcanization. It has now been discovered that the cure rate of phenol di-alcohol vulcanized Butyl rubber can be accelerated by treating the rubber in the presence of a small amount of chlorinated Butyl rubber.

Figure 1:
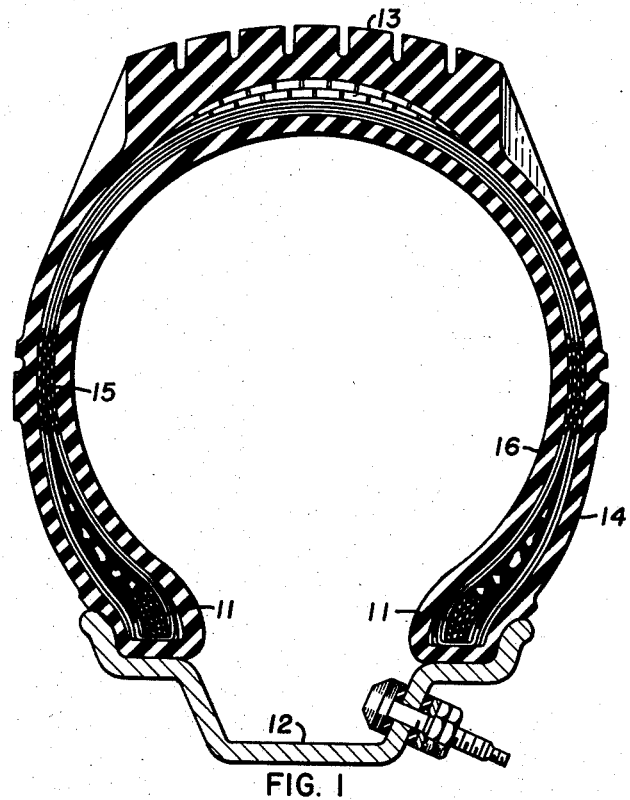
Figure 2:
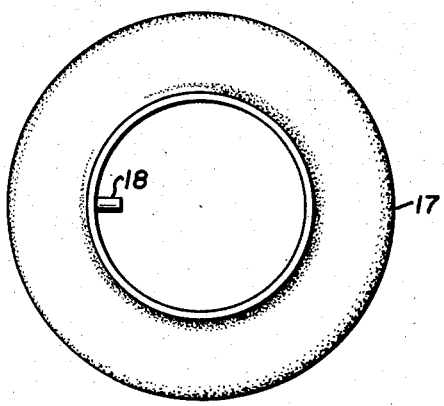
Figure 3:
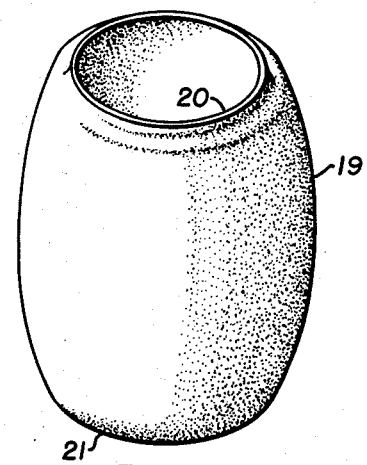
Figure 4:
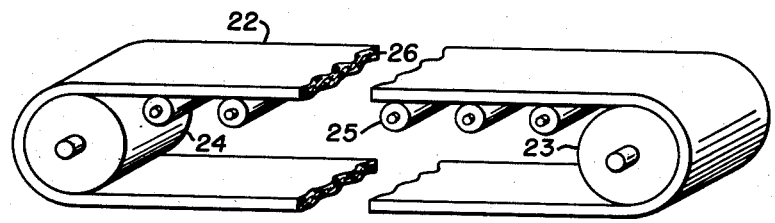
Figure 5:
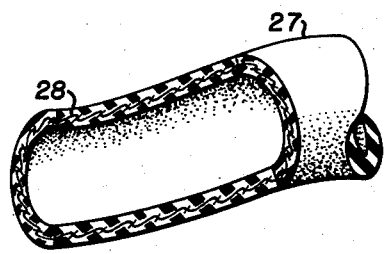

The invention will be best understood from the following description, in which reference will be made to the drawings wherein Figure 1 is a vertical section of a pneumatic tubeless tire; Figure 2 is a view in side elevation of a tire casing curing bag; Figure 3 is a perspective view of a curing bladder or diaphragm used in Bag-O-Matic tire presses; Figure 4 is an edgewise perspective view of a conveyor belt; and Figure 5 is a perspective view, partly in section, of a hose. All of the foregoing articles contain Butyl rubber which has been cured in accordance with the present invention.

Butyl rubber or GR–I (Government Rubber–Isobutylene) contains about 85–99.5% (preferably about 95–99.5%) of a $C_4$–$C_7$ isoolefin, such as isobutylene with about 15 to 0.5% (preferably about 5 to 0.5 wt. percent) of a multiolefin of about 4–14, preferably 4–8, carbon atoms. The expression "Butyl rubber" as employed in the specification and claims, is intended to include copolymers having about 90–99.5% by weight of an isoolefin of about 4–7 carbon atoms and about 10 to 0.5% by weight of a conjugated multiolefin of about 4–10 carbon atoms. The preparation of Butyl type rubbers is described in U. S. Patent 2,356,128. In general, the rubber comprises the reaction product of a $C_4$–$C_7$ isoolefin, preferably isobutylene with a $C_4$–$C_{10}$, preferably a $C_4$–$C_6$, conjugated diolefin such as isoprene, butadiene, dimethyl butadiene, piperylene, etc. The substantially oxygen-free reaction product of isobutylene and isoprene is preferred.

Copending application Serial No. 512,182 describes several processes for preparing chlorinated Butyl rubber. Generally, they are chlorinated so as to contain about at least 0.5 wt. percent combined chlorine but not more than "X" wt. percent combined chlorine wherein:

$$X = \frac{35.46L}{(100-L)M_1 + L(M_2+35.46)} \times 100$$

and;

$L=$ mol percent of multiolefin in polymer
$M_1=$ molecular weight of isoolefin
$M_2=$ molecular weight of multiolefin
$35.46=$ atomic weight of chlorine Restated, there should be at least about 0.5 wt. percent of combined chlorine, preferably at least 1 wt. percent, in the polymer but not more than 1 atom of combined chlorine per molecule of multiolefin.

Suitable chlorinating agents which may be employed are gaseous chlorine, alkali metal hypochlorides (preferably sodium hypochloride) alkyl hypochlorides (preferably $C_4$–$C_{10}$ tertiary alkyl hypochlorides) sulfur chlorides (particularly oxygenated sulfur chlorides) pyridinium chloride perchloride, N-chloro succinimide, alpha-chloro-acetoacetanilide trichlorophenol chloride, N-chloroacetamide, beta-chloro-methyl-phthalimide and other common chlorinating agents. The preferred chlorinating agents are gaseous chlorine and sulfur chloride.

The chlorination is generally conducted at about 0 to 100° C. It is more desirable to carry the reaction out at about 0 to 65° C. and it is preferable to use temperatures in the range of about 20–50° C. Depending upon the particular chlorinating agent employed, the reaction time may be from about 1 minute to several hours. An advantageous pressure range is from about 0.5–400 p. s. i. a., with atmospheric pressure being quite satisfactory. The chlorination conditions are regulated to chlorinate the rubber copolymer to the extent mentioned above. For example, if the rubber to be chlorinated is Enjay Butyl 218, previously called GR–I–18, it is preferred to chlorinate in such a way that the product has about 0.5 to 2.5 wt. percent combined chlorine. A more desirable range of chlorine is between about 1 and 2 wt. percent with about 1.2–1.8 wt. percent combined chlorine being preferred.

The chlorination may be accomplished in several ways. One process comprises preparing a solution of the copolymer in an inert liquid solvent such as a $C_3$–$C_8$ hydrocarbon or halogenated derivative of a saturated hydrocarbon. Suitable solvents for the purpose of the present invention are hexane, heptane, pentane, branched chain paraffins, naphtha, kerosene, straight run mineral spirits, cyclohexane, cyclopentane, alkyl substituted chloroparaffins, benzene, toluene, chlorobenzene, chloroform, trichloroethane, carbon tetrachloride, and mixtures thereof.

The gaseous or other chlorinating agent is then added either as is or in solution, for example dissolved in an inert hydrocarbon, carbon tetrachloride, etc.

The concentration of Butyl rubber in the solvent will depend on the type of reactor, the molecular weight of the rubber, etc. In general, the concentration of a Butyl rubber having a viscosity average molecular weight of about 200,000 to 400,000, if the solvent is a substantially inert hydrocarbon will be between 1 and 30 wt. percent and preferably between about 5 and 20 wt. percent. If chlorine gas is employed to chlorinate it may be diluted with up to 5 times its volume. It is preferred that the chlorine be diluted with about 0.1 to 2.0 times its volume of an inert gas such as nitrogen, methane, ethane, carbon dioxide, etc.

The resulting chlorinated Butyl rubber polymer may be recovered in several ways. It may be precipitated with acetone, or any other known non-solvent for the rubber and dried under about 1–760 mm. or higher mercury pressure absolute at about 0–180° C. The preferred drying temperature is between about 50 and 150° C. Other methods of recovering the chlorinated butyl polymer from the hydrocarbon solution are by conventional spray or drum drying techniques. Alternatively, the chlorinated Butyl rubber-containing solution may be injected into a vessel containing agitated water heated to a temperature sufficient to flash off the hydrocarbon solvent and form an aqueous slurry of the chlorinated Butyl rubber. The chlorinated Butyl rubber is then separated from the slurry by filtration, dried and recovered as a "crumb" or a dense sheet or slab by conventional milling and/or extruding procedures.

The chlorinated copolymer should have a viscosity average molecular weight between about 250,000 and 2,000,000 and a mol percent unsaturation between about 0.5 and 10 and preferably between about 0.6 and 5.0.

The dimethylol phenols are typically made by reacting a para-substituted phenol having the two ortho positions unoccupied, with a considerable molar excess of formaldehyde, the molar ratio of formaldehye to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g., 25–100° C., during the first stage of the reaction involving the formation of the phenol methylol, i. e., the para-substituted 2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state. This is the resol type of resin.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha,alpha,gamma, gamma-tetramethyl butyl) being especially preferred among the lower alkyls (8 carbon atoms or less), cycloalkyl groups, aryl groups, such as phenyl, and aralkyl groups such as benzyl and cumyl. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-dodecyl phenol
2,6-dimethylol-4-octyl phenol
2,6-dimethylol-4-phenyl phenol
2,6-dimethylol-4-benzyl phenol
2,6-dimethylol-4-(alpha,alpha-dimethyl benzyl) phenol
2,6-dimethylol-4-cyclohexyl phenol The dimethylol phenol is generally employed in an amount within the range of from about 8 to 15 parts by weight to 100 parts of the Butyl rubber.

In the practice of this invention, 100 parts by weight of Butyl rubber is compounded with about 1 to 40 parts by weight of a dimethylol phenol. The amount of dimethylol phenol should be between about 5 and 20 parts by weight and preferably in the range between 8 and 15 parts by weight. In addition, generally between about 2 to 50 parts by weight of chlorinated Butyl rubber is employed per 100 parts Butyl rubber. An advantageous range is between 2 and 20 parts by weight and it is preferred to use between about 3 and 10 parts of the chlorinated Butyl rubber.

To the above composition, about 0 to 50 wt. percent, advantageously about 1 to 30 wt. percent, and preferably about 2 to 20 wt. percent, of a basic metal, such as zinc oxide, magnesium oxide, calcium oxide, lead oxide, or basic metallo-organic compounds such as basic lead stearate, may be added. The addition of the above basic metal compounds leads to improved physical properties for the same concentration of dimethylol phenol. These vulcanizable-compositions are then cured at an increased rate at a temperature between about 250 and 400° F. The curing time may be from about a minute up to several hours. It is preferred to cure at a temperature between about 270 and 350° F. for about 10 minutes to 5 hours.

The uncured Butyl rubber may also be blended with about 1 to 10 wt. percent of a stabilizer such as a group II metal silicate, particularly calcium silicate, and/or with about 1 to 5 wt. percent of an adsorbable deactivator such as various high boiling polar compounds, for example ethylene glycol, during or preferably before the rubber is compounded with fillers and curatives.

The amount of filler added per 100 parts by weight of Butyl rubber is generally about 20 to 90 parts for tie ply compositions, and somewhat higher, say about 40 to 180, preferably about 50 to 130 parts for compositions suitable for inner linings of tires.

Preferred isoolefin-polyolefin interpolymers for use in the present invention are the solid, plastic, rubbery interpolymers containing a major proportion, desirable from 70 to 99 wt. percent, of an isoolefin generally containing from 4 to 8 carbon atoms such as, most desirably, isobutylene or, alternatively, 3-methyl-butene-1,4-methyl-pentene-1, 2-ethyl-butene-1, 4-ethyl-pentene-1 or the like or a mixture of such isoolefins, with a minor proportion, desirably from 1 to 30 wt. percent, of a polyolefinic hydrocarbon generally containing from 4 to 18 carbon atoms, or two, three or more such hydrocarbons, including the following:

(1) Preferably acyclic or open-chain conjugated diolefins such as butadiene-1,3, isoprene, 2,4-dimethyl-butadiene-1,3, piperylene, 3-methyl-pentadiene-1,3, hexadiene-2,4, 2-neopentyl-butadiene-1,3, and the like;

(2) Acyclic nonconjugated diolefins such as dimethallyl and its homologs containing 2 to 6 carbon atoms interposed between the two isopropenyl radicals, 2-methyl-hexadiene-1,5, 2-methyl-pentadiene-1,4, 2-methyl-heptadiene-1,6, 2-methyl-heptadiene-1,4 and other tertiary non-conjugated diolefins having one double bond in the terminal position attached to a tertiary carbon atom;

(3) Alicyclic diolefins, both conjugated and non-conjugated such as cyclopentadiene, cyclohexadiene, 1-vinyl-cyclohexene-3, 1-vinyl-cyclohexene-1, 1-vinyl-cyclopentene-1, 1-vinyl-cyclobutene-2, dicyclopentadiene, and the like as well as monocyclic diolefinic terpenes such as dipentene, terpinenes, terpinolene, phellandrenes, sylvestrene and the like;

(4) Acyclic triolefins such as 2,6-dimethyl-4-methylene-heptadiene-2,5, 2-methyl-hexatriene-1,3,5 and other conjugated triolefins, as well as myrcene, ocimene, allo-ocimene and the like;

(5) Alicyclic triolefins such as fulvene, 6,6-dimethyl-fulvene, 6,6-methyl-ethyl-fulvene, 6-ethyl-fulvene, 6,6-diphenyl-fulvene, and 6-phenyl-fulvene, as well as other alicyclic triolefins such as 1,3,3-trimethy-6-vinyl-cyclohexadiene-2,4, cycloheptatriene, etc.;

(6) Higher polyolefins such as 6,6-vinyl-methyl-fulvene (a tetraolefin) and 6,6-diisopropenyl-fulvene (a pentaolefin); and (7) Polyolefinic hydrocarbons containing aromatic nuclei such as the phenyl butadiene, divinyl benzenes, diallyl benzenes, vinyl allyl benzene and divinyl naphthalenes.

The preferred solid, plastic, rubbery interpolymers for use in preparing chlorinated derivatives, are generally themselves prepared by low temperature (temperatures range from 0° C. to as low as −165° C. but are generally about −100° C.) interpolymerization reaction utilizing an appropriate catalyst, generally on active metal halide or Friedel-Crafts type catalyst such as aluminum chloride or boron trifluoride, dissolved in a solvent with a low freezing point such as methyl or ethyl chloride, and when so prepared, generally possess an average molecular weight above 15,000 and usually as high as 200,000 or higher, iodine numbers in the range of 0.5 to 50, and are reactive with sulfur to yield elastic products on suitable heating. Of the preferred interpolymers, we find it most desirable in preparing the chlorinated derivatives of this invention to utilize the solid, plastic interpolymers of isobutylene with small amounts of isoprene or butadiene, of the character of Butyl rubbers which contain about 90 to 99 wt. percent of isobutylene and 1 to 10 wt. percent of aliphatic conjugated diolefin and preferably containing less than 5 wt. percent of aliphatic conjugated diolefin.

In addition, isoolefin-polyolefin interpolymers containing other interpolymerized monomers such as styrene, chlorostyrene, acrylyl chloride, methylallyl chloride, and other monoolefinic monomers may also be used to prepare various derivatives. For example, interpolymers containing 70% isobutylene, 15% styrene and 15% isoprene may be prepared and used in accordance with the present invention.

The Butyl rubber employed in these experiments contains 98% by weight isobutylene and 2% by weight isoprene and had a viscosity average molecular weight of about 320,000. The reactants, isobutylene and isoprene, were mixed in a ratio of about 96 parts by weight isobutylene to about 4 parts by weight isoprene, and dissolved in methyl chloride. To this mixture was added a solution of aluminum chloride dissolved in methyl chloride in sufficient quantities to correspond to about 0.1–0.2 part by weight of aluminum chloride per 100 parts by weight reactants. The polymerization was conducted at about −100° C., the solvent was stripped off and the catalyst inactivated by water washing. The rubbery polymer was recovered and then compounded in accordance with the present invention.

The chlorinated Butyl rubber employed was prepared by dissolving Butyl rubber which was made according to the foregoing procedure in hexane to form a 15% by weight solution. A sufficient amount of this solution was taken to correspond to 100 parts by weight of the copolymer. To this was added about 2–5 parts by weight chlorine gas and the mixture was stirred for about 10 minutes in the absence of light and maintaining the hexane in a liquid state. The unreacted chlorine and/or dissolved hydrogen chloride was neutralized with a 20% solution of sodium carbonate and the rubbery chlorinated copolymer was recovered as a water slurry and dried. It was substantially free of uncombined chlorine and contained about 1.25% by weight chlorine and had a viscosity average molecular weight of about 320,000.

Amberol ST–137 is a trade designation for a mixture of multi-cyclic phenol dialcohols believed to be made directly from 1 mol of paraoctyl phenol, 2 mols of formaldehyde and 1 mol of sodium hydroxide, the alkali being carefully neutralized after the condensation is complete. It is solid phenolic resin.

In order to more fully illustrate the present invention, the following experimental data are given. All the recipes are in parts by weight.

EXAMPLE 1

Butyl rubber prepared from isobutylene and isoprene, as described above, was compounded according to the following recipes:

| Ingredients | A | B |
|---|---|---|
| Butyl rubber | 100 | 100 |
| Chlorinated Butyl rubber | | 5 |
| Amberol ST–137 | 12 | 12 |
| Carbon Black (HAF) | 60 | 60 |
| Stearic acid | 1 | 1 |
| Zinc Oxide | 5 | 5 |

Portions of each formula were cured at 325° F. for different periods of time and then evaluated for their physical properties. The results are set forth in Table I below.

Table I

| Physical Properties | A | B |
|---|---|---|
| Tensile, p. s. i.: | | |
| 30′ Cure @ 325° F | 1,925 | 2,200 |
| 60′ | 2,275 | 2,485 |
| 120′ | 2,315 | 2,545 |
| Elongation, percent: | | |
| 30′ Cure @ 325° F | 610 | 535 |
| 60′ | 480 | 465 |
| 120′ | 375 | 390 |
| Shore "A" Hardness: | | |
| 30′ Cure @ 325° F | 67 | 66 |
| 60′ | 69 | 68 |
| 120′ | 73 | 70 |
| Mod. p. s. i. @ 100%: | | |
| 30′ Cure @ 325° F | 285 | 390 |
| 60′ | 385 | 425 |
| 120′ | 550 | 495 |

These data show that Butyl rubber compounded for a dimethylol phenol cure can be accelerated in cure rate by a small amount of chlorinated Butyl rubber. Furthermore, the tensile strength of the vulcanized Butyl rubber cured in the presence of these materials is substantially greater than Butyl rubber cured with dimethylol phenol in the absence of chlorinated Butyl rubber. This is a very desirable feature because it is now possible to not only increase the cure rate of Butyl rubber but, in addition, enhance its strength.

EXAMPLE 2

The vulcanizates A and B in Example 1 were aged for 16 hours at 400° F. to determine their heat stability. At the end of this time they were physically evaluated. Table II shows the effect that heat had on these rubbers.

Table II

| Physical Properties | A | B |
|---|---|---|
| Tensile, p. s. i.: | | |
| 30′ Cure @ 325° F | 1,185 | 1,245 |
| 60′ | 1,220 | 1,285 |
| 120′ | 1,195 | 1,255 |
| Elongation, percent: | | |
| 30′ Cure @ 325° F | 285 | 265 |
| 60′ | 280 | 270 |
| 120′ | 275 | 265 |
| Shore "A" Hardness: | | |
| 30′ Cure @ 325° F | 73 | 73 |
| 60′ | 74 | 72 |
| 120′ | 74 | 70 |
| Mod. p. s. i. @ 100%: | | |
| 30′ Cure @ 325° F | 440 | 455 |
| 60′ | 465 | 470 |
| 120′ | 455 | 455 |

The results illustrate that vulcanizates compounded according to recipe B in Example 1 age as well as Butyl rubber cured in the absence of chlorinated Butyl rubber. It was also noted that the original tensile strength advantage which vulcanizate B had over vulcanizate A was retained throughout the aging period. This is indicative that the excellent high heat aging characteristics of Butyl rubber are not impaired by the acceleration techniques used in this invention.

Therefore, according to the present invention, the curing rate of Butyl rubber is accelerated by vulcanizing it with a dimethylol phenol in the presence of a small amount of chlorinated Butyl rubber. The use of chlorinated Butyl rubber has the additional advantage of producing a vulcanizate with increased tensile strength properties. Furthermore, it has been shown that rubbers made according to the present invention are just as heat stable as Butyl rubber cured in the absence of chlorinated Butyl rubber.

Referring now to the drawings, Figure 1 depicts a pneumatic tubeless tire which comprises a hollow toroidal type member which is substantially U-shaped in cross-section by virtue of an open portion which extends around the inner periphery of the member. The tire is of a tubeless type structure which has a cross-section in the form of an open-bellied body with spaced terminal portions to define a member generally resembling a horseshoe. The terminal portions constitute the bead portions 11—11 of the tire inside of which are a plurality of bead wires adhesively embedded and molded in a rubber. The outer surface of the bead portion is advantageously formed into an air-sealing means, such as a plurality of ribs to aid in adhesion to rim 12 when the tire is inflated. The outer surface of the tire also includes tread area 13 and sidewalls 14. The open portion of the horseshoe shaped tire faces that portion of the inner circumference of the tire which is adjacent the said tread area 13 of the tire.

The remaining construction of the tire may vary according to conventional fabrication, but in general the tire is a multi-layered type of structure with an outer layer as above mentioned. The layer next adjacent the outer layer generally comprises a carcass 15 which includes a rubber which has incorporated therein a fabric composed of a plurality of cotton, rayon, steel or nylon cords, etc. The tire also includes an inner lining 16 advantageously made from rubber, e. g. Butyl rubber which has been at least partially vulcanized for about 1 to 60 minutes at about 250°–400° F. in accordance with the present invention. This inner lining must be substantially impermeable to air. The above multi-layers, at least three in number, are conventionally bonded or otherwise adhered together, for example, by cementing and/or especially by vulcanizing in the presence of dimethylol phenols and chlorinated rubber according to the invention to form a tire of a unitary structure.

The compositions of chlorinated Butyl rubber of the present invention may be employed generally throughout the tire. For example, the inner lining 16 may comprise Butyl rubber vulcanized in accordance with the present invention. Alternatively, the inner lining 16 may comprise ordinary Butyl rubber which has been bonded to carcass 15 by an interposed tie ply of Butyl rubber which has been preferably vulcanized in accordance with the invention. Such an interposed tie ply facilitates the inclusion of highly unsaturated rubbers such as natural rubber, GR–S rubber, Buna-N-rubber, mixtures thereof, etc. in the carcass.

The other layers of the tire, such as the intermediate carcass layer and/or the outer layer (including the tread area, the sidewall and the outer bead portions, etc.), may also comprise Butyl rubber vulcanized in accordance with the invention. Vulcanization of the carcass, plies (if any), sidewalls, and tread area is advantageously accomplished by heating the same for about 3 to 60 minutes or more at about 250° to 400° F. The chlorinated Butyl rubber compositions of the present invention included in the tire may also contain certain bivalent metal oxides and especially zinc oxide and/or magnesium oxide with or without added sulfur.

The tubeless tire may also contain, in at least the tread area 13, an oil-extended high molecular weight (e. g. viscosity average molecular weight of about 900,000 to about 2,000,000) Butyl rubber which has been bonded to a more highly unsaturated rubber (or rubbers) in carcass 15 by an interposed tie ply of rubber which has been advantageously vulcanized in the presence of dimethylol phenol compounds and chlorinated Butyl rubber in accordance with the invention.

The combination of advantages realized by the present vulcanization process renders the invention particularly suited for the manufacture of curing bags. In the accompanying drawing, Figure 2 illustrates a curing bag made up of a vulcanizate of the invention. A suitable formulation for the curing bag is as follows:

| | Parts by weight |
|---|---|
| Butyl rubber | 100 |
| Chlorinated Butyl | 2 to 20 |
| Zinc oxide | 2 to 20 |
| Carbon black | 30 to 80 |
| Stearic acid | 0 to 5 |
| Amberol ST–137 (dimethylol phenol condensate) | 1 to 40 |

The above compound is shaped into the form of the curing bag 17 in accordance with conventional practice and is then cured in a mold at 300° F. to 350° F. for 20 minutes to 1½ hours. The curing bag 17 is an annular toroidal form and has an external shape corresponding to the interior contour of the pneumatic tire casing to be cured thereon, and is equipped with the usual connecting stem 18, by means of which a heated fluid under pressure, such as hot water, may be introduced into the interior cavity of the bag during vulcanization of the tire. The bag may thereby be expanded to cause the tire to conform closely to the surfaces of the mold cavity in which the tire is vulcanized.

Non-black fillers, such as silicas or aluminum and calcium silicate, may be used in place of carbon black. The amount of filler used in these articles (curing bags, hoses, etc.) depends on the hardness desired.

The resulting curing bag is far superior to conventional curing bags in its resistance to deteriorating influences.

Figure 3 is a hollow cylindrical curing bladder 19 of the type used in Bag-O-Matic tire presses made with rubber prepared according to the present invention. The top 20 and bottom 21 of the bladder are sealed when in position on the press by a combination of bead and clamping rings, not shown, which also form the bead area of the tire mold. A Bag-O-Matic tire press is illustrated and described on pages 314 and 318 to 319 in Machinery and Equipment for Rubber and Plastics, vol. I, Primary Machinery & Equipment (1952), compiled by R. G. Seaman and A. M. Merrill.

Another embodiment of the present invention is its use in conveyor belts and steam hoses. The heat resistance properties of Butyl rubber made according to the present invention make it particularly adaptable for use in steam hoses and conveyor belts where carrying hot materials is involved.

Figure 4 shows a conveyor belt 22 containing Butyl rubber cured by means of a dimethylol phenol in the presence of chlorinated Butyl rubber in position on a drive roller 23, idle roller 24 and idle roller supports 25. A suitable formula is as follows:

| | Parts by weight |
|---|---|
| Butyl rubber | 100 |
| Zinc oxide | 10 |
| Amberol ST–137 | 12 |
| Chlorinated Butyl | 5 |
| Carbon black | 60 |
| Process oil | 20 |
| Antioxidant | 1 |

The belt may consist wholly of rubber or it may be supported or have embedded within the rubber a fabric 26.

Figure 5 shows a central longitudinal section broken away of a flexible rubber tube 27. A suitable formula for the rubber used in steam hoses is:

| | Parts by weight |
|---|---|
| Butyl rubber | 100 |
| Zinc oxide | 10 |
| Amberol ST–137 | 12 |
| Chlorinated Butyl | 5 |
| Carbon black | 60 |
| Process oil | 20 |
| Antioxidant | 1 |

Again, as in the case of the conveyor belt, the rubber may be supported by a fabric 28.

Resort may be had to various modifications and variations of the present invention without departing from the spirit or scope of the appended claims.

What is claimed is:

1. A composition comprising a major proportion of a low unsaturated isoolefin-conjugated diolefin rubbery copolymer containing at least 90% isoolefin; minor proportions of a low unsaturated isoolefin-conjugated diolefin chlorinated rubbery copolymer containing at least 70% isoolefin and at least 0.5 wt. percent chlorine; and a minor proportion of a dimethylol, para-hydrocarbon substituted phenol compound, said hydrocarbon being selected from the group consisting of $C_{3-20}$ alkyl groups, cyclo-alkyl, aryl and aralkyl groups.

2. A composition comprising 100 parts by weight of a low unsaturated rubbery copolymer of at least 90% isobutylene and a conjugated diolefin having from 4 to 8 carbon atoms, said rubbery copolymer having an iodine number below 50, about 2 to 20 parts by weight of a low unsaturated chlorinated rubbery copolymer of at least 70% isobutylene and a conjugated diolefin having from 4 to 8 carbon atoms, said chlorinated rubbery copolymer containing at least about 0.5 wt. percent chlorine but not more than 1 combined atom of chlorine per double bond, and about 1 to 40 parts by weight of a 2,6-dimethylol, para-hydrocarbon substituted phenol said hydrocarbon being selected from the group consisting of $C_{3-20}$ alkyl groups, cyclo-alkyl, aryl and aralkyl groups.

3. A composition according to claim 2 in which the diolefins are butadiene.

4. A composition according to claim 2 in which the diolefins are isoprene.

5. A composition according to claim 2 in which the diolefins are piperylene.

6. A composition according to claim 2 in which the Staudinger molecular weight of the rubbery copolymers is above about 15,000.

7. A composition according to claim 2 in which the amount of chlorinated rubbery copolymer is between about 3 and 10 parts by weight.

8. A composition according to claim 2 in which the amount of 2,6-dimethylol substituted phenol is between about 5 and 20 parts by weight.

9. A composition according to claim 2 in which the 2,6-dimethylol substituted phenol is 2,6-dimethylol-4 lower alkyl substituted phenol.

10. A composition according to claim 2 in which the 2,6-dimethylol substituted phenol is 2,6-dimethylol-4-octyl phenol.

11. A composition according to claim 2 in which the 2,6-dimethylol substituted phenol is 2,6-dimethylol-4-tertiary butyl phenol.

12. A composition comprising 100 parts by weight of a rubbery copolymer containing about 90 to 99.5 wt. percent of a $C_4-C_7$ isoolefin and about 10–0.5 wt. percent of a $C_4-C_{14}$ multiolefin, said rubbery copolymer having a Staudinger molecular weight above 15,000 and an iodine number below 50, about 3 to 10 parts by weight of a chlorinated rubbery copolymer containing about 70 to 99.5 wt. percent of a $C_4$ to $C_7$ isoolefin, and about 30–0.5 wt. percent of a $C_4$ to $C_{14}$ multiolefin, said chlorinated rubbery copolymer having between about 0.5 wt. percent and 2.5 wt. percent combined chlorine, and about 8 to 15 parts by weight of 2,6-dimethylol-4 lower alkyl substituted phenol said alkyl having 3–20 carbon atoms.

13. In a process for vulcanizing Butyl rubber comprising heating 100 parts by weight of a rubbery copolymer of at least 90% isobutylene and a conjugated diolefin having from 4 to 8 carbon carbon atoms with from about 5 to 20 parts by weight of a 2,6-dimethylol-4-hydrocarbon substituted phenol at a temperature between about 250 and 400° F. for a sufficient time to cure the copolymer said hydrocarbon being selected from the group consisting of $C_{3-20}$ alkyl groups, cyclo-alkyl, aryl and aralkyl groups, the improvement which comprises the step of carrying out the vulcanization in the presence of about 2 to 20 parts of a chlorinated rubbery copolymer of at least 70% isobutylene and a conjugated diolefin having from 4 to 8 carbon atoms, said chlorinated rubbery copolymer containing at least 0.5 wt. percent chlorine but not more than 1 combined atom of chlorine per double bond in the copolymer.

14. A method of vulcanizing a synthetic rubbery copolymer of at least 90% isobutylene and a conjugated diolefin having from 4 to 8 carbon atoms, said rubbery copolymer having a Staudinger molecular weight above about 15,000 and an iodine number below 50, comprising mixing 100 parts of said rubbery copolymer with from about 1 to 40 parts of a 2,6-dimethylol-4 hydrocarbon substituted phenol said hydrocarbon being selected from the group consisting of $C_{3-20}$ alkyl groups, cyclo-alkyl, aryl and aralkyl groups and about 2 to 20 parts of a chlorinated rubbery copolymer of at least 70% isobutylene and a conjugated diolefin having 4 to 8 carbon atoms, said chlorinated rubbery copolymer having a Staudinger molecular weight above about 15,000, an iodine number below 50 and at least 0.5 wt. percent chlorine but not more than about 1 combined atom of chlorine per double bond, heating the resulting mixture at a temperature between about 250 and 400° F. for a sufficient time to effect a cure thereof and recovering a vulcanized rubber.

15. A method according to claim 14 in which the conjugated diolefin of the chlorinated rubbery copolymer is isoprene.

16. A method according to claim 14 in which the conjugated diolefin of the chlorinated rubbery copolymer is butadiene.

17. A method according to claim 14 in which the conjugated diolefin of the chlorinated rubbery copolymer is piperylene.

18. A method according to claim 14 in which the dimethylol phenol is an oil soluble 2,6-dimethylol-4 lower alkyl substituted phenol.

19. A method of vulcanizing according to claim 14 in which the hydrocarbon-substituted phenol is in the form of a resin.

20. A rubber tire which contains a rubbery copolymer of at least 90% isobutylene and a diolefin having from 4 to 8 carbon atoms, said copolymer having an iodine number below 50 and a Staudinger molecular weight above about 15,000 which was cured with a minor proportion of a 2,6-dimethylol, para-hydrocarbon substituted phenol said hydrocarbon being selected from the group consisting of $C_{3-20}$ alkyl groups, cyclo-alkyl, aryl and aralkyl groups in the presence of a minor amount of a chlorinated rubbery copolymer of at least 70% isobutylene and a diolefin having 4 to 8 carbon atoms, said clorinated rubbery copolymer having an iodine number below 50 and a Staudinger molecular weight above about 15,000 and at least 0.5 wt. percent chlorine but not more than 1 atom of chlorine per double bond in the copolymer.

21. A curing bag which contains a rubbery copolymer of at least 90% isobutylene and a diolefin having from 4 to 8 carbon atoms, said copolymer having an iodine number below 50 and a Staudinger molecular weight above about 15,000 which was cured with a minor amount of a 2,6-dimethylol, para-hydrocarbon substituted phenol said hydrocarbon being selected from the group consisting of $C_{3-20}$ alkyl groups, cyclo-alkyl, aryl and aralkyl groups in the presence of a minor amount of a chlorinated rubbery copolymer of at least 70% isobutylene and a diolefin having 4 to 8 carbon atoms, said chlorinated rubbery copolymer having an iodine number below 50 and a Staudinger molecular weight above about 15,000 and at least 0.5 wt. percent chlorine but not more than 1 atom of chlorine per double bond in the copolymer.

22. A curing bladder which contains a rubbery copolymer of at least 90% isobutylene and a diolefin having from 4 to 8 carbon atoms, said copolymer having an iodine number below 50 and a Staudinger molecular weight above about 15,000, which was cured with a minor amount of a 2,6-dimethylol, para-hydrocarbon substituted phenol said hydrocarbon being selected from the group consisting of $C_{3-20}$ alkyl groups, cyclo-alkyl, aryl and aralkyl groups in the presence of a minor amount of a chlorinated rubbery copolymer of at least 70% isobutylene and a diolefin having 4 to 8 carbon atoms, said chlorinated rubbery copolymer having an iodine number below 50 and a Staudinger molecular weight above about 15,000 and at least 0.5 wt. percent chlorine but not more than 1 atom of chlorine per double bond in the copolymer.

23. A flexible hose which contains a rubbery copolymer of at least 90% isobutylene and a diolefin having from 4 to 8 carbon atoms, said copolymer having an iodine number below 50 and a Staudinger molecular weight above about 15,000, which was cured with a minor proportion of a 2,6-dimethylol, para-hydrocarbon substituted phenol said hydrocarbon being selected from the group consisting of $C_{3-20}$ alkyl groups, cyclo-alkyl, aryl and aralkyl groups in the presence of a minor amount of a chlorinated rubbery copolymer of at least 70% isobutylene and a diolefin having 4 to 8 carbon atoms, said chlorinated rubbery copolymer having an iodine number below 50 and a Staudinger molecular weight above about 15,000 and at least 0.5 wt. percent chlorine but not more than 1 atom of chlorine per double bond in the copolymer.

24. A conveyor belt which contains a rubbery copolymer of at least 90% isobutylene and a diolefin having from 4 to 8 carbon atoms, said copolymer having an iodine number below 50 and a Staudinger molecular weight above about 15,000 which was cured with a minor amount of a 2,6-dimethylol, para-hydrocarbon substituted phenol said hydrocarbon being selected from the group consisting of $C_{3-20}$ alkyl groups, cyclo-alkyl, aryl and aralkyl groups in the presence of a minor amount of a chlorinated rubbery copolymer of at least 70% isobutylene and a diolefin having 4 to 8 carbon atoms, said chlorinated rubbery copolymer having an iodine number below 50 and a Staudinger molecular weight above about 15,000 and at least 0.5 wt. percent chlorine but not more than 1 atom of chlorine per double bond in the copolymer.

25. A composition comprising 100 parts by weight of a rubbery copolymer containing about 90 to 99.5 wt. percent of a $C_4$–$C_7$ isoolefin and about 10 to 0.5 wt. percent of a $C_4$–$C_{14}$ multiolefin, said rubbery copolymer having a Staudinger molecular weight above about 15,000 and an iodine number below 50, about 3–10 parts by weight of a chlorinated rubbery copolymer containing about 70 to 99.5 wt. percent of a $C_4$–$C_7$ isoolefin and about 30 to 0.5 wt. percent of a $C_4$–$C_{14}$ multiolefin, said chlorinated rubbery copolymer having between about 0.5 and 2.5 wt. percent combined chlorine, and about 8–15 parts by weight of a 2,6-dimethylol-4 alkyl-substituted phenol resin in which the alkyl group has 3–20 carbon atoms.

26. A vulcanized product comprising 100 parts by weight of an isoolefin-olefin copolymer containing at least 90% isoolefin and having an iodine number below 50, and about 2–20 parts by weight of a chlorinated isoolefin-diolefin rubbery copolymer having an iodine number below 50 and containing at least 70% isoolefin and between about 0.5 and 2.5 wt. percent combined chlorine, said rubbery copolymer and said chlorinated rubbery copolymer having been vulcanized with from about 1–40 parts by weight of a 2,6-dimethylol-4 $C_2$–$C_{20}$ hydrocarbon phenol resin said hydrocarbon being selected from the group consisting of alkyl, cyclo-alkyl, aryl, and aralkyl groups.

27. A curing bladder which contains 100 parts by weight of an isobutylene-isoprene rubbery copolymer containing at least 90% isoolefin and having an iodine number below 50 and about 2–20 parts by weight of a chlorinated isobutylene-isoprene copolymer having an iodine number below 50 and containing at least 70% isobutylene and between about 0.5 and 2.5 wt. percent combined chlorine cured with about 8–15 parts by weight of a 2,6-dimethylol-4 $C_3$–$C_8$ alkyl-substituted phenol resin.

References Cited in the file of this patent

UNITED STATES PATENTS

| | | |
|---|---|---|
| 2,701,895 | Tawney et al. | Feb. 15, 1955 |
| 2,726,224 | Peterson et al. | Dec. 6, 1955 |
| 2,727,874 | Peterson et al. | Dec. 20, 1955 |
| 2,732,354 | Morrissey et al. | Jan. 24, 1956 |
| 2,749,323 | Schaefer et al. | June 5, 1956 |